United States Patent [19]
Nanba et al.

[11] Patent Number: 5,796,704
[45] Date of Patent: Aug. 18, 1998

[54] OPTICAL DISK APPARATUS AND RECORDING AND REPRODUCING METHOD OF OPTICAL RECORDING MEDIUM

[75] Inventors: Yoshiyuki Nanba; Masaharu Moritsugu, both of Kawasaki, Japan

[73] Assignee: Fujitsu Limited, Kawasaki, Japan

[21] Appl. No.: 530,705

[22] Filed: Sep. 19, 1995

[30] Foreign Application Priority Data

Feb. 17, 1995 [JP] Japan ................ 7-028943

[51] Int. Cl.$^6$ ........................... G11B 7/00
[52] U.S. Cl. .................... 369/116; 369/54; 369/94; 369/13; 369/32
[58] Field of Search ................. 369/116, 120, 369/106, 110, 112, 94, 54, 58, 48, 13, 32, 111

[56] References Cited

U.S. PATENT DOCUMENTS

| | | | |
|---|---|---|---|
| 5,050,156 | 9/1991 | Barton | 369/116 |
| 5,185,733 | 2/1993 | Finkelstein et al. | 369/54 |
| 5,185,734 | 2/1993 | Call et al. | 369/116 |
| 5,251,198 | 10/1993 | Strickler | 369/110 |
| 5,341,360 | 8/1994 | Johann et al. | 369/116 |
| 5,400,313 | 3/1995 | Belser et al. | 369/116 |
| 5,488,590 | 1/1996 | Watanabe et al. | 369/13 |
| 5,493,545 | 2/1996 | Matsumoto | 369/13 |
| 5,499,229 | 3/1996 | Murakami et al. | 369/13 |

FOREIGN PATENT DOCUMENTS

| | | |
|---|---|---|
| 61-214266 | 9/1986 | Japan |
| 1-179224 | 7/1989 | Japan |
| 1-191326 | 8/1989 | Japan |
| 1-191327 | 8/1989 | Japan |
| 1-191329 | 8/1989 | Japan |
| 3-093058 | 4/1991 | Japan |
| 3-152748 | 6/1991 | Japan |
| 4-053048 | 2/1992 | Japan |
| 4-082038 | 3/1992 | Japan |
| 4-238133 | 8/1992 | Japan |
| 4-325935 | 11/1992 | Japan |
| 5-101471 | 4/1993 | Japan |

*Primary Examiner*—Loha Ben
*Attorney, Agent, or Firm*—Greer, Burns & Crain

[57] ABSTRACT

A magnetooptic recording medium having a writing layer and a readout layer on a substrate is used. Data is recorded in the writing layer of the magnetooptic recording medium at a recording density smaller than a diameter of a focal spot of a laser beam. The data recorded in the writing layer of the magnetooptic recording medium at the recording density smaller than the beam diameter is reproduced by setting a reproducing laser power to a proper value. A reproduction laser power calibrating module executes the reproducing operation for calibration of the magnetooptic recording medium, thereby deciding the optimum value of the laser power which is used upon reproduction. For example, the reproduction laser power calibrating module measures a change in reproduction signal while raising the reproducing laser power by using a predetermined minimum reproducing laser power W0 as an initial value and a value obtained by adding a predetermined value Wc to the reproducing laser power (W) when the reproduction signal doesn't change to the optimum reproducing laser power.

28 Claims, 11 Drawing Sheets

OPTICAL DISK APPARATUS AND RECORDING AND REPRODUCING METHOD OF OPTICAL RECORDING MEDIUM

BACKGROUND OF THE INVENTION

The invention relates to an optical disk apparatus for recording and reproducing information by using a laser beam and to a recording and reproducing method of a magnetooptic recording medium. More particularly, the invention relates to an optical disk apparatus for recording and reproducing data at a density smaller than a beam diameter by a method known as an MSR (Magnetically induced Super Resolution) technique and to a recording and reproducing method of an optical recording medium.

In recent years, an optical disk has been highlighted as an external recording medium of a computer. In the optical disk, by forming magnetic recording marks of the submicron order onto a medium by using a laser beam, a recording capacity can be extremely increased as compared with that of a floppy disk or a hard disk as a conventional external recording medium so far. Further, in a magnetooptic disk as a vertical magnetic recording medium using a material of the rare earth-transition metal system, since information can be rewritten, its development is more and more expected in future.

The optical disk has a memory capacity of, for example, about 128 MB per one side of the disk of a diameter of 3.5 inches. Such a capacity is equal to a memory capacity in the case where, tracks are formed on an optical disk of 3.5 inches at a pitch of 1.6 μm in the direction of a disk radius of 24 to 40 mm and marks in which the smallest value is equal to about 0.75 μm are recorded in the circumferential direction. Since one floppy disk of 3.5 inches has a memory capacity of about 1 MB, this means that one optical disk has a memory capacity as much as 128 floppy disks. As mentioned above, the optical disk is a rewritable recording medium having a extremely high recording density. However, it is necessary to further increase the recording density of the optical disk higher than the present recording density in order to prepare for the age of the multimedia. To raise the recording density, a larger number of marks have to be recorded on the medium. For this purpose, it is necessary to further reduce a size of mark than the present mark and to narrow the interval between the marks. In case of raising the recording density by such a method, it is necessary to set a wavelength of the laser beam to be shorter than 780 nm of the present wavelength. When considering a case of putting into practical use, however, the mark size has to be reduced at the present wavelength of 780 nm. In this case, when recording, the mark smaller than the beam diameter can be formed by controlling a power of the laser beam. As for the reproduction, however, when the mark smaller than the beam diameter is reproduced, a crosstalk with a neighboring mark increases. In the worst case, the neighboring mark is also included in a reproduction beam, so that it is remarkably difficult to form such a small mark when considering the practical use.

Figure 1A:
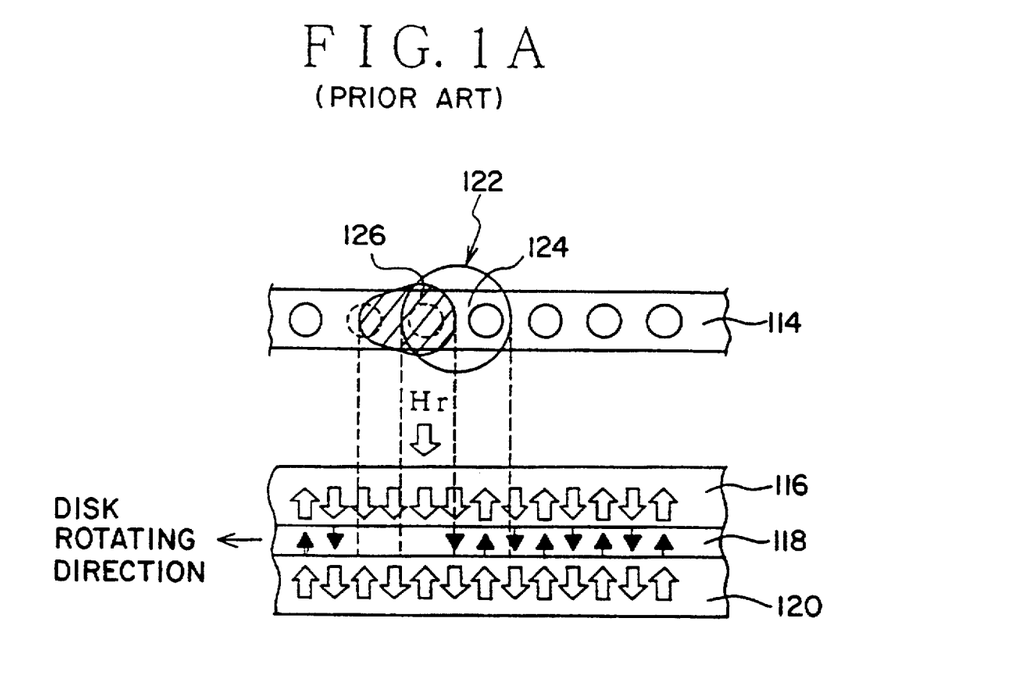
FIGS. 1A and 1B are explanatory diagrams of a conventional medium recording.
Figure 1B:
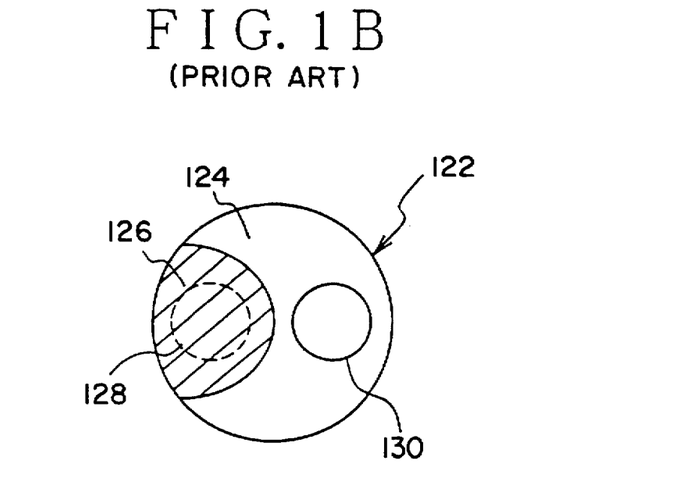

As a method of reproducing the mark smaller than the beam diameter by the present wavelength of 780 nm, there is a magnetooptic recording and reproducing method represented by JP-A-3-93058. Such a method is known as a recording and reproducing method by the MSR (Magnetically induced Super Resolution) technique. In such a method, there are two kinds of methods such as "Front Aperture Detection (FAD)" and "Rear Aperture Detection (RAD)". According to the FAD, as shown in FIGS. 1A and 1B, a recording medium 114 is divided to a writing layer 120 and a readout layer 116. In a state in which a focal spot 122 of a read beam is irradiated to such a medium, by applying a reproducing magnetic field Hr, marks are reproduced. At this time, depending on a temperature distribution of a medium heated by the focal spot 122, with respect to a portion of a writing mark 128, the magnetic coupling of a switching layer 118 which is formed at a boundary between the readout layer 116 and the writing layer 120 is released. The switching layer 118 is influenced by the reproducing magnetic field Hr and becomes a mask portion 126. On the other hand, with respect to a portion of a writing mark 130, the magnetic coupling of the switching layer 118 is held and the switching layer 118 becomes an aperture 124. Therefore, only the mark 130 of the aperture portion can be read without being influenced by the adjacent mark 128.

Figure 2A:
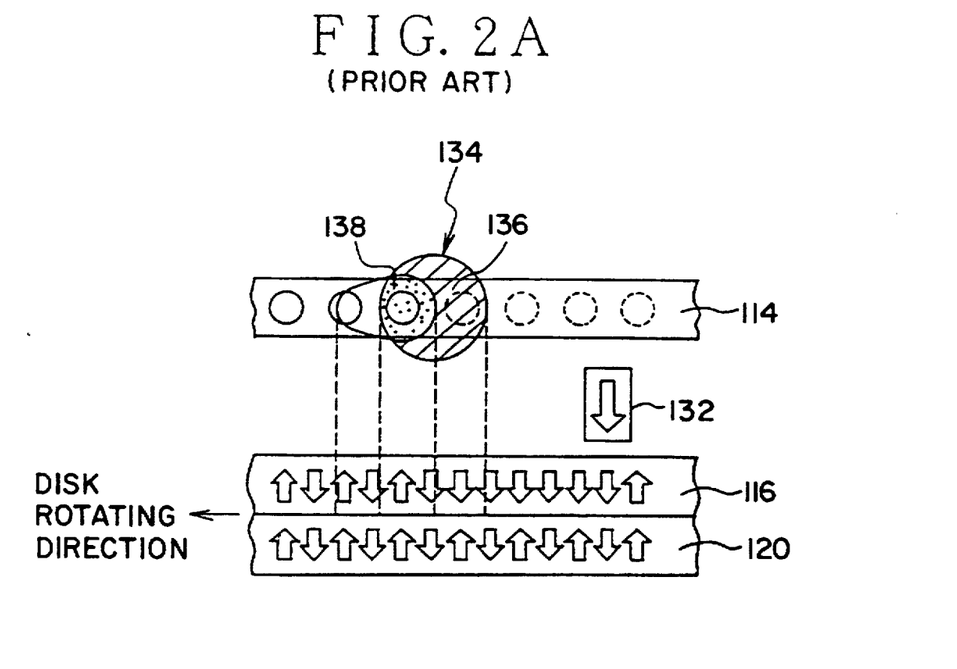
FIGS. 2A and 2B are explanatory diagrams of a conventional medium reading.
Figure 2B:
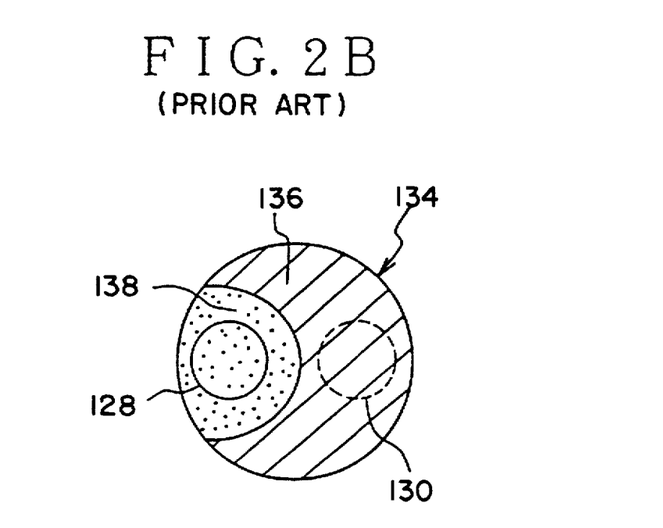

According to the RAD, on the other hand, as shown in FIGS. 2A and 2B, an initialization to align the magnetizing direction of the readout layer 116 to a predetermined direction by using an initializing magnet 132 is performed. A reproducing laser power upon reproduction is slightly raised and a focal spot 134 of a read beam is irradiated. In this instance, depending on a temperature distribution of a medium heated by the focal spot 134, a mask 136 in which the initial magnetization information remains and an aperture 138 in which the initial magnetization information is erased and to which magnetization information of the writing layer 120 is transferred are formed onto the readout layer 116. The magnetization information of the writing layer 120 transferred to the readout layer 116 is converted to an optical signal by a magnetooptical effect (Kerr effect or Faraday effect), thereby reproducing data. At this time, as compared with the mark 128 of the writing layer 120 read out at present, since the mark 130 of the writing layer 120 which will be read out next is not transferred because the mask 136 is formed by the initial magnetization information of the readout layer 116, even if a writing mark is smaller than the focal spot 134, no crosstalk occurs and a mark smaller than the beam diameter can be reproduced. Further, by using such a magnetically induced super resolution technique, since the area of the writing layer 120 other than the readout portion is in a state in which it is masked by the initialized readout layer 116, a mark interference from the adjacent mark doesn't occur and the interval between the marks can be further narrowed. The crosstalk from the adjacent track can be also suppressed. Therefore, the track pitch can be also reduced. Even when the present wavelength of 780 nm is used, a high density can be realized.

According to the conventional optical disk apparatus using the MSR technique as mentioned above, however, there is a problem such that unless the reproducing laser power, which is used upon reproduction, is strictly controlled, a proper reproducing operation cannot be performed. This is because in the case where the reproducing laser power is too low, a transfer from the writing layer to the readout layer doesn't occur, so that the data that ought to have been recorded cannot be read out. On the contrary, when the reproducing laser power is too high, there is a possibility such that the data in the writing layer is broken. In order to solve such a phenomenon, it is insufficient to merely adjust the reproducing laser power, and such a phenomenon remarkably depends on an environment temperature in the apparatus which decides a temperature of the recording medium. Namely, when the environment temperature in the apparatus is changed to a low temperature side, the transfer from the writing layer to the readout layer doesn't sufficiently occur and a level of the reproduction signal decreases and an error rate increases. On the contrary, when the environment temperature in the apparatus is changed to a high temperature side, there is a possibility such that the data in the writing layer is broken.

SUMMARY OF THE INVENTION

According to the invention, there are provided an optical disk apparatus and a recording and reproducing method of a magnetooptic recording medium, in which in case of using a magnetically induced super resolution technique, even when an environment temperature in the apparatus is changed, an optimum reproducing laser power is always set, a data destruction upon writing is prevented, and a decrease in level of a reproduction signal upon reproduction and an impossibility of the reproduction thereof are prevented.

An optical disk apparatus of the invention uses a magnetooptic recording medium in which at least a writing layer to record data and a readout layer to reproduce the data recorded in the writing layer are formed on a substrate. A writing unit records data into the writing layer of the magnetooptic recording medium at a recording density smaller than a beam diameter of a laser beam. A readout unit reproduces the data recorded in the writing layer of the magnetooptic recording medium at the recording density smaller than the beam diameter by setting a reproducing laser power to a proper value.

According to the invention, in addition to the above units, a reproduction power calibrating module is provided and an optimum value of the reproducing laser power is decided by performing a reproducing operation of the magnetooptic recording medium. The reproduction power calibrating module sets a predetermined minimum reproducing laser power W0 to an initial value, measures a change in reproduction signal while increasing the reproducing laser power, and sets a reproducing laser power obtained by adding a predetermined value Wc to a reproducing laser power (W) when the reproduction signal doesn't change to an optimum reproducing laser power. In this case, the reproducing laser power is raised step by step at a resolution that is equal to or less than at least $\Delta W=0.5$ mW, thereby deciding the optimum reproducing laser power. The predetermined value Wc within a range from 0.5 mW to 2.5 mW is added to the reproducing laser power when the reproduction signal doesn't change, thereby deciding the optimum reproducing laser power. It is also possible that the reproduction power calibrating module sets a predetermined minimum reproducing laser power to an initial value, measures an error rate of the reproduction signal while raising the reproducing laser power, and sets a reproducing laser power obtained by adding a predetermined value to the reproducing laser power when no error occurs to the optimum reproducing laser power. The optimum laser power decided by the reproduction power calibrating module is used only for a reproducing period of time that is decided by a reproduction gate signal. The reproduction laser power calibrating module calibrates the reproducing laser power at the time of an initialization diagnosing process in association with a turn-on of a power source of the apparatus. During the operation of the apparatus after that, the reproducing laser power is calibrated at every predetermined time intervals. Further, a temperature sensor for detecting an environment temperature in the apparatus is provided. When the reproducing laser power is calibrated, in the case where a degree of a change in temperature detected by the temperature sensor decreases as compared with the temperature at the preceding time, the calibration of the reproducing laser power at every predetermined time intervals is stopped until the temperature change exceeds a predetermined value. On the other hand, in the case where a degree of a change in value of the optimum reproducing laser power decided by the calibration of the reproducing laser power at every predetermined time intervals decreases as compared with the value at the preceding time, the calibration of the reproducing laser power at every predetermined time intervals is stopped. Each time the magnetooptic recording medium is inserted in the apparatus, the reproduction power calibrating module calibrates the reproducing laser power. Therefore, even while the calibration at every predetermined time intervals is stopped, when the magnetooptic recording medium is inserted in the apparatus, the reproduction power calibrating module certainly performs the calibration. Further, when an interruption request is received from an upper apparatus during the calibration of the reproducing laser power, the reproduction power calibrating module can set a priority regarding whether the calibration is interrupted and the interruption request is processed or the calibration is continued.

According to the invention, there is further provided a recording and reproducing method of a magnetooptic recording medium using a magnetically induced super resolution technique. This method has the following processing steps.

A magnetooptic recording medium having at least a writing layer to record data and a readout layer to reproduce the data recorded in the writing layer on a substrate is provided. Data is recorded in the writing layer of the magnetooptic recording medium at a recording density smaller than a beam diameter of a laser beam.

By setting a reproducing laser power to a proper value, the data recorded in the writing layer of the magnetooptic recording medium at the recording density smaller than the beam diameter is reproduced.

Prior to the reproduction of the magnetooptic recording medium, by executing the reproducing operation of the magnetooptic recording medium, a reproduction power calibrating process to decide an optimum value of the reproducing laser power is executed.

The details of the calibrating process of the reproducing power in the recording and reproducing method are substantially the same as those of the reproduction power calibrating module of the optical disk apparatus.

According to the optical disk apparatus and the recording and reproducing method of the magnetooptic recording medium of the invention as mentioned above, with respect to the magnetooptic recording medium having at least the writing layer to record data and the readout layer to reproduce the data recorded in the writing layer on the substrate, data is recorded at a recording density (recording density equal to or larger than a cut-off space frequency) smaller than the beam diameter, and the optimum reproducing laser power, which is used when the data recorded at the recording density smaller than the beam diameter on the magnetooptic recording medium is reproduced, is set to the optimum value obtained by the calibrating process at which the reproducing operation of the apparatus is actually performed. Therefore, even when the environment temperature in the apparatus changes or when a medium having different characteristics is inserted, a situation such that the data cannot be read out due to a lack of reproducing laser power, or the recorded data is broken because the reproducing laser power is too strong, is certainly prevented, so that the optimum reproducing operation can be always realized. At the time of the calibrating operation, while changing the reproducing laser power from the minimum power step by step, a value at which the reproduction signal doesn't change is obtained, a predetermined value is added to such a value, thereby deciding the optimum value. Thus, the calibrating process can be efficiently performed and a period of time during which the use of the apparatus is interrupted by the calibrating operation can be minimized.

The above and other objects, features, and advantages of the present invention will become more apparent from the following detailed description with reference to the drawings.

DETAILED DESCRIPTION OF THE PREFERRED EMBODIMENTS

Figures 3, 3B:
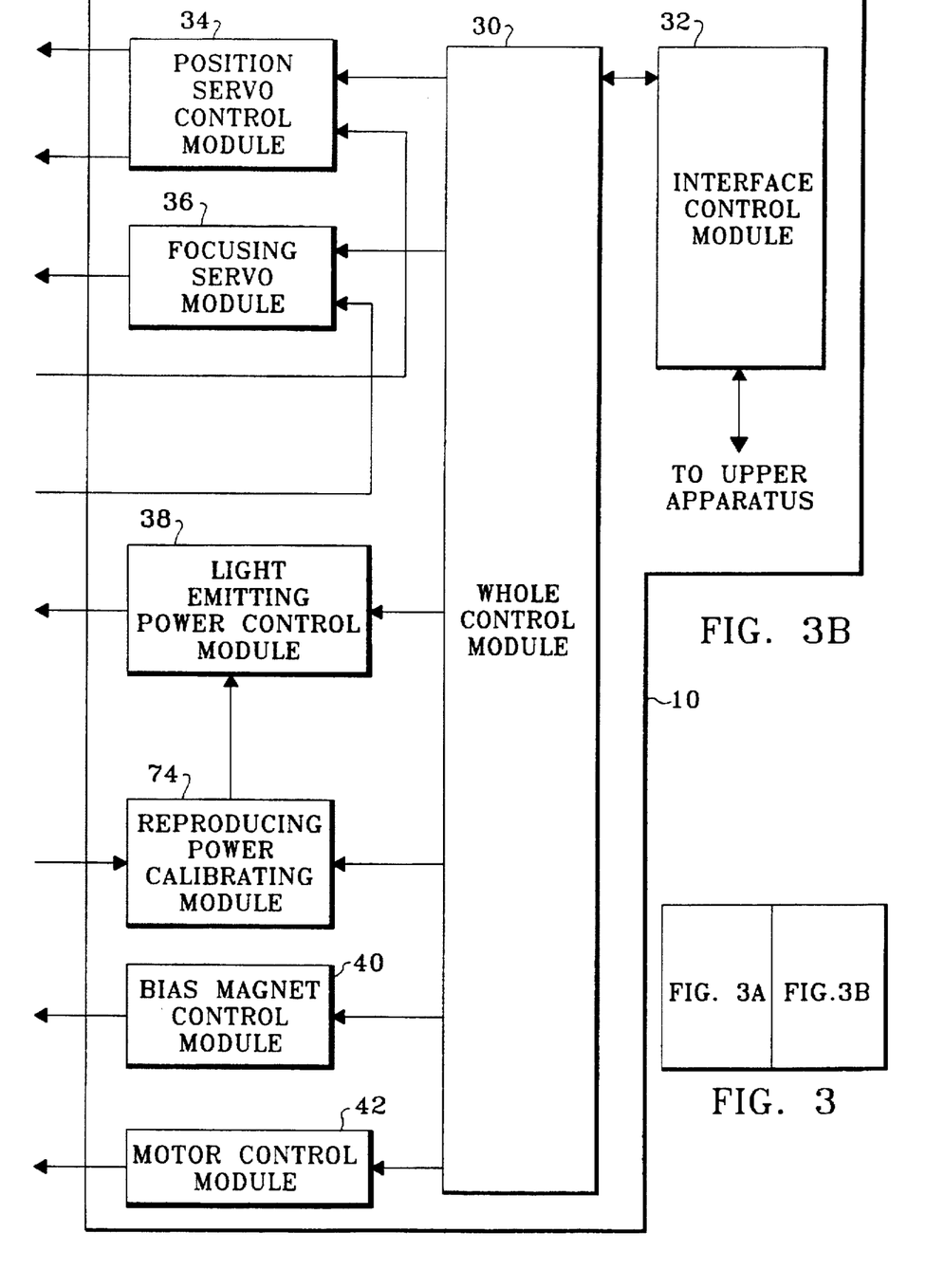
FIG. 3, which is divided into two sections 3A and 3B, is a block diagram showing an embodiment of the invention.
Figure 3A:
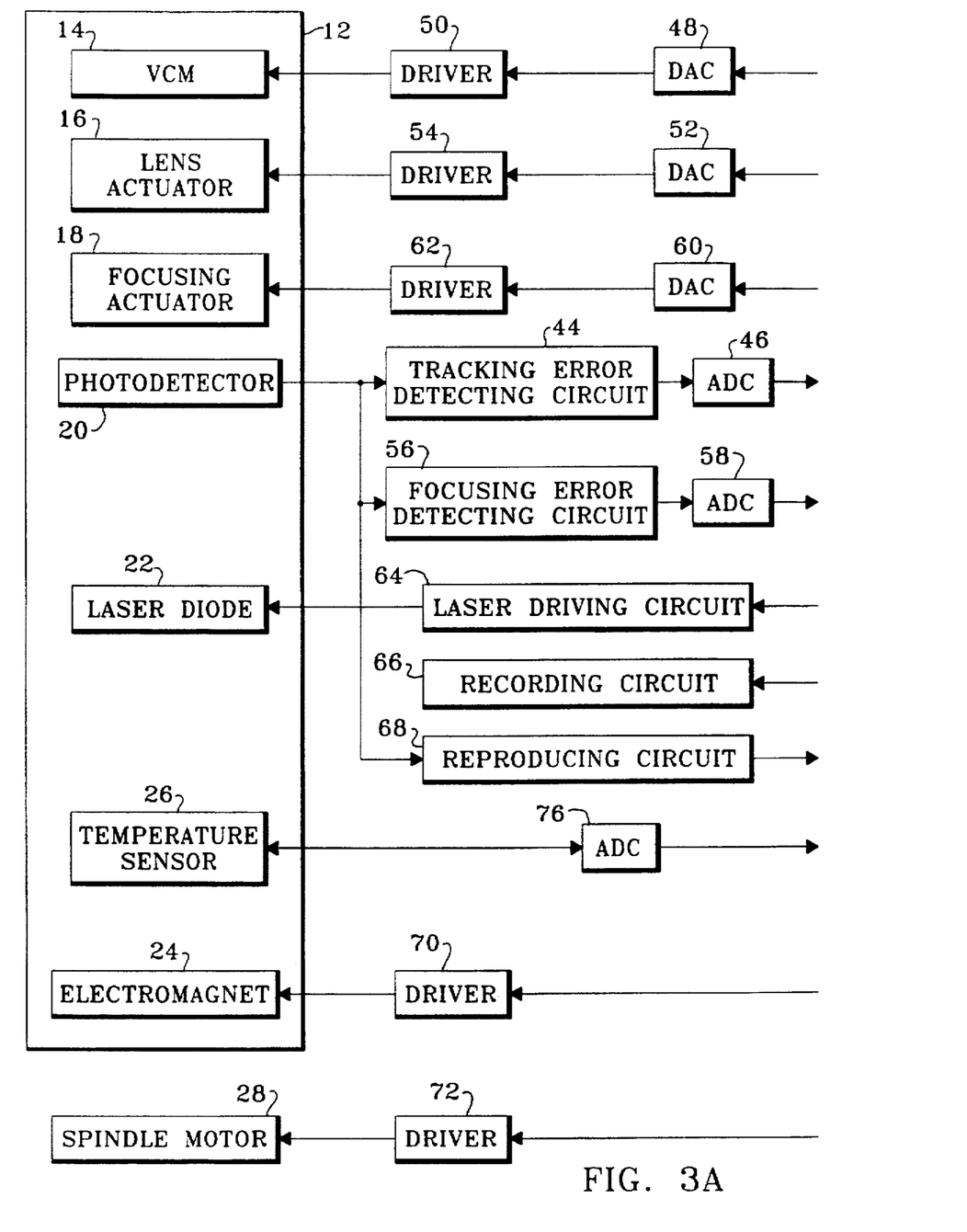

FIG. 3, which is divided into two sections 3A and 3B, is a block diagram of an optical disk apparatus of the invention. The optical disk apparatus has a controller 10 and an optical head (optical pickup) 12. The optical head 12 includes a VCM 14 for moving the optical head 12 in the radial direction of the optical disk and positioning. A lens actuator 16 is also installed in the optical head 12. The lens actuator 16 is also called a tracking actuator and moves an objective lens to form a laser beam as an image onto a disk surface by a distance within a range of a predetermined track and controls a beam position. In the seeking operation, when the number of tracks to be moved is large, the optical head 12 is moved by the VCM 14. In the case where the number of cylinders to be moved is small to be, for example, 50 tracks, the laser beam is moved by the lens actuator 16. A focusing actuator 18 moves the objective lens provided for the optical head 12 in the direction of an optical axis and adjusts a focal point so that a specific beam spot is formed as an image onto the disk medium surface. A photodetector 20 receives a reflection light obtained by the irradiation of the laser beam to the medium surface of the optical disk. As a photodetector 20, for example, a 4-split photodetector is used. A tracking error, a focusing error, and further, a reproduction signal can be obtained by synthesizing light reception signals of four light receiving sections. A laser diode 22 generates a write beam in the writing operation, a read beam in the reading operation, and further, an erase beam in the erasing operation. In the invention, a laser beam of a wavelength of 780 nm is used. As a laser diode 22, one laser diode which is commonly used for the write beam, read beam, and erase beam can be also used. It is also possible that one laser diode is used for the write beam and erase beam and another leaser diode is used for the read beam. An electromagnet 24 generates an external magnetic field for initialization in the erasing operation. According to the invention, since an optical disk having at least a writing layer and a readout layer on a substrate according to a magnetically induced super resolution technique is used as an optical disk, the electromagnet 24 is used as an initializing magnet upon reproduction of such an optical disk. A temperature sensor 26 detects an environment temperature in the apparatus.

In this case, although the optical head 12 is shown as one unit, the head is actually divided into a movable unit which is moved in the radial direction of the optical disk and a fixed unit fixed to a casing of the apparatus. The lens actuator 16 and focusing actuator 18 are installed in the movable unit of the optical head 12. The VCM 14, photodetector 20, laser diode 22, temperature sensor 26, and electromagnet 24 are installed in the fixed unit, thereby reducing a weight of the movable unit as much as possible. A spindle motor 28 rotates the optical disk of the optical disk apparatus. Since the optical disk apparatus of the invention intends to use an optical disk of 3.5 inches enclosed in a cartridge as a target, the optical disk is chucked with a rotary axis of the spindle motor 28 by loading the cartridge to the apparatus. The spindle motor 28 is activated after completion of the chucking, thereby rotating the optical disk at a predetermined speed.

The controller 10 will now be described hereinbelow. A function of the controller 10 is realized by a program control of a microprocessor (MPU) or a digital signal processor (DSP). A whole control module 30 is provided for the controller 10 and transmits and receives commands, data, or the like to/from an upper optical disk control unit through an interface control module 32. After completion of the initialization diagnosing operation at the time of the turn-on of the power source, when receiving an access request from an upper optical disk control apparatus through the interface control module 32, the whole control module 30 performs the seeking operation for a designated track address, on-track controls the optical head 12 so as to be positioned to a target track, and allows the optical head 12 to perform the writing, reading, or erasing operation in such a state. A position servo control module 34, a focusing servo module 36, a light emitting power control module 38, a bias magnet control module 40, and a motor control module 42 are provided for the whole control module 30. A tracking error signal is detected by a tracking error detecting circuit 44 from the signal detected by the photodetector 20 and is supplied to an A/D converter 46. On the basis of an output signal of the A/D converter 46, the position servo control module 34 executes the seeking operation and the on-track control after completion of the seeking operation. An output of the position servo control module 34 drives the VCM 14 through a D/A converter 48 and a driver 50, and also drives the lens actuator 16 through a D/A converter 52 and a driver 54. A focusing error detection signal obtained by a focusing error detecting circuit 56 based on the detection signal of the photodetector 20 is supplied to an A/D converter 58. An output signal of the A/D converter 58 is supplied to the focusing servo module 36. The focusing servo module 36 drives the focusing actuator 18 through a D/A converter 60 and a driver 62, and focusing-controls the laser beam so as to have a specific spot diameter. Under the control instructions of the writing, reading, and erasing operations by the whole control module 30, the light emitting power control module 38 controls a drive current of the laser diode 22 through a laser driving circuit 64 so as to have a specific light emitting power which has been predetermined for each of the above operations and generates a laser beam of the specific light emitting power. In the erasing operation or at the time of the initial magnetization upon reproduction, the bias magnet control module 40 drives the electromagnet 24 through a driver 70. The motor control module 42 receives an activating instruction based on the completion of the insertion of the optical disk into the cartridge from the whole control module 30 and rotates the spindle motor 28 at a predetermined speed through a driver 72. Further, a recording circuit 66 and a reproducing circuit 68 are provided in the outside of the controller 10. The recording circuit 66 operates as a data modulating circuit, receives write data in the reading operation by the whole control module 30, forms a modulation signal, and supplies to the laser driving circuit 64, thereby executing a modulation control according to the write data of the laser beam of the write beam. The reproducing circuit 68 functions as a data demodulating circuit, demodulates data from a reproduced light reception signal from the photodetector 20 of the optical head 12, and supplies to the whole control module 30.

According to the invention, further, a reproduction power calibrating module 74 is newly provided for the controller 10. On the basis of an instruction from the whole control module 30, the reproduction power calibrating module 74 performs a calibrating operation to decide an optimum reproducing laser power which is used when reproducing the optical disk. An analog reproduction signal obtained by the reproducing circuit 68 and a temperature detection signal from the temperature sensor 26 are converted to digital data by an A/D converter 76 and the digital data is supplied to the reproduction power calibrating module 74.

Figure 4:
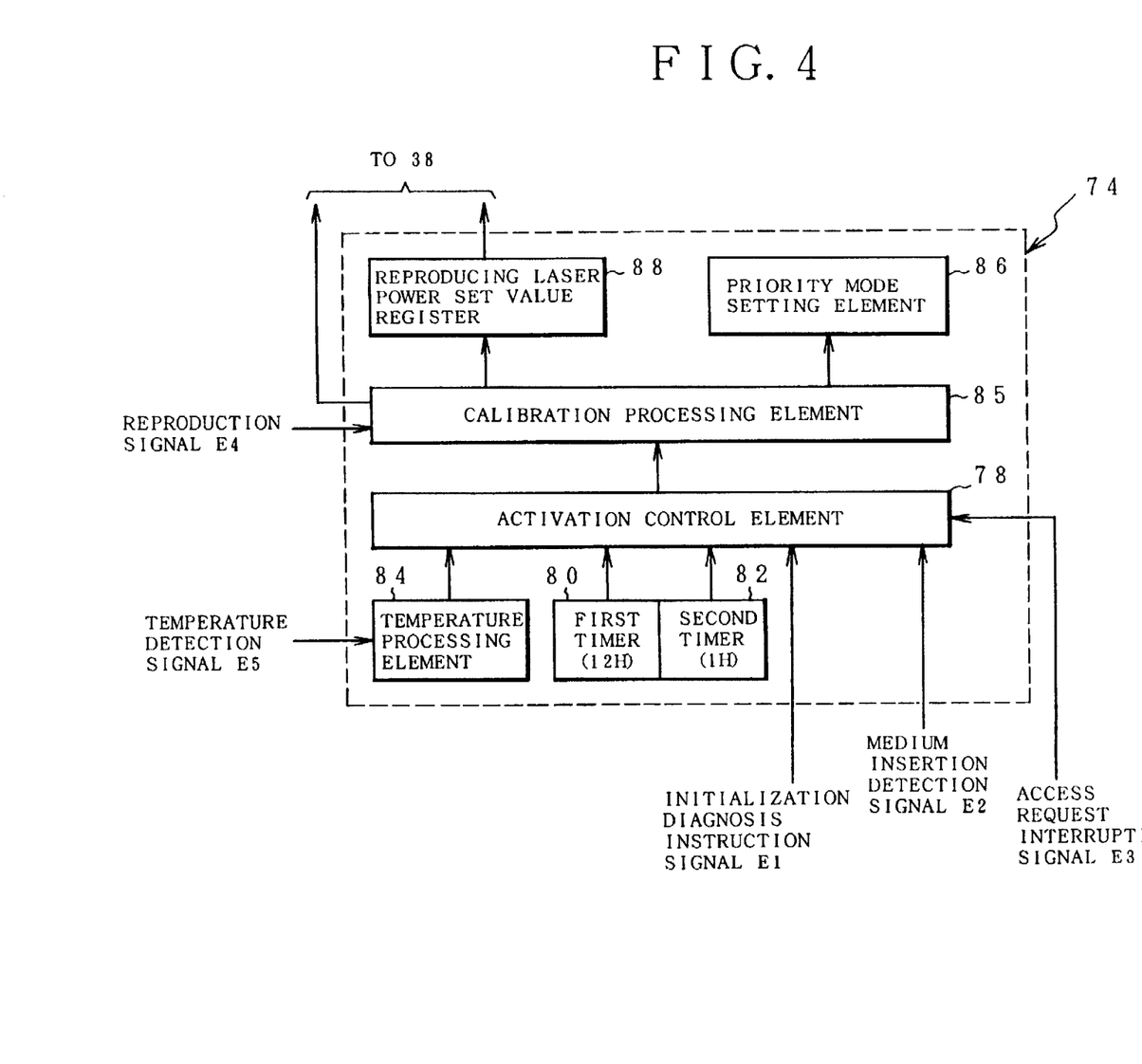
FIG. 4 is a functional block diagram of a reproduction power calibrating module in FIG. 3.

FIG. 4 is a functional block diagram of the reproduction power calibrating module 74 in FIG. 3. An activation control element 78, a calibration processing element 85, a priority mode setting element 86, and a reproducing laser power set value register 88 are provided for the reproduction power calibrating module 74. A processing result based on the temperature detection signal from the temperature sensor 26 is supplied to the activation control element 78 through a temperature processing element 84. A first timer 80 and a second timer 82 are provided for the activation control element 78. A period of time until an environment temperature in the apparatus becomes stable and a periodic calibrating operation is not needed after the apparatus was power-on started is set in the first timer 80. As a set time of the first timer 80, a relatively long time such as 12 hours, 24 hours, or the like is set. The second timer 82 sets a predetermined time interval to execute the calibrating operation after the apparatus was power-on started. As compared with the set time of the first timer 80, a relatively short time such as, for example, one hour is set as a set time of the second timer 82. An initialization diagnosis instruction signal E1, a medium insertion detection signal E2, and an access request interruption signal E3 are supplied to the activation control element 78. In association with the power-on start of the apparatus, the activation control element 78 activates the calibration processing element 85 at the time of the reception of the initialization diagnosis instruction signal E1, thereby activating the calibrating process to decide the reproducing laser power. After that, the activation control element 78 activates the calibration processing element 85 at every predetermined time interval set by the second timer 82, for example, once an hour, thereby executing the calibrating operation. When the time set by the first timer 80, for example, elapse of 12 hours after the power-on start, a timer output of the first timer 80 is supplied to the activation control element 78. After the activation control element 78 receives the timer output of the first timer 80, even when receiving the subsequent timer output at every one hour by the second timer 82, the activation control element 78 doesn't execute the activating process of the calibration processing element 85. In such a state, the activation control element 78 checks a temperature difference between the preceding detection temperature and the present detection temperature which were detected by the temperature processing element 84. Only in the case where the temperature difference is equal to or larger than a predetermined value, the calibrating process of the calibration processing element 85 is activated. On the other hand, when receiving the medium insertion detection signal E2, irrespective of timer conditions of the first and second timers 80 and 82, the activation control element 78 certainly activates the calibration processing element 85, thereby performing the calibrating operation to obtain the reproducing laser power. When there is an access request from the upper optical disk control unit during the operation of the calibration processing element 85, the access request interruption signal E3 is supplied to the activation control element 78. The calibrating operation of the calibration processing element 85 when receiving the access request interruption signal E3 depends on a mode setting of the priority mode setting element 86. In response to the access request interruption signal E3 from the upper optical disk control unit, either one of a mode to interrupt the calibrating process that is being executed and to execute the interrupting process of the access request and a mode to continue the calibrating process without interrupting is set to the priority mode setting element 86. Thus, the process according to the set mode for the access request interruption signal E3 is executed. The priority mode for the priority mode setting element 86 can be also set by using a panel or a board of the apparatus by the operator or can be also set by a command from the upper optical disk control unit side.

Figure 5:
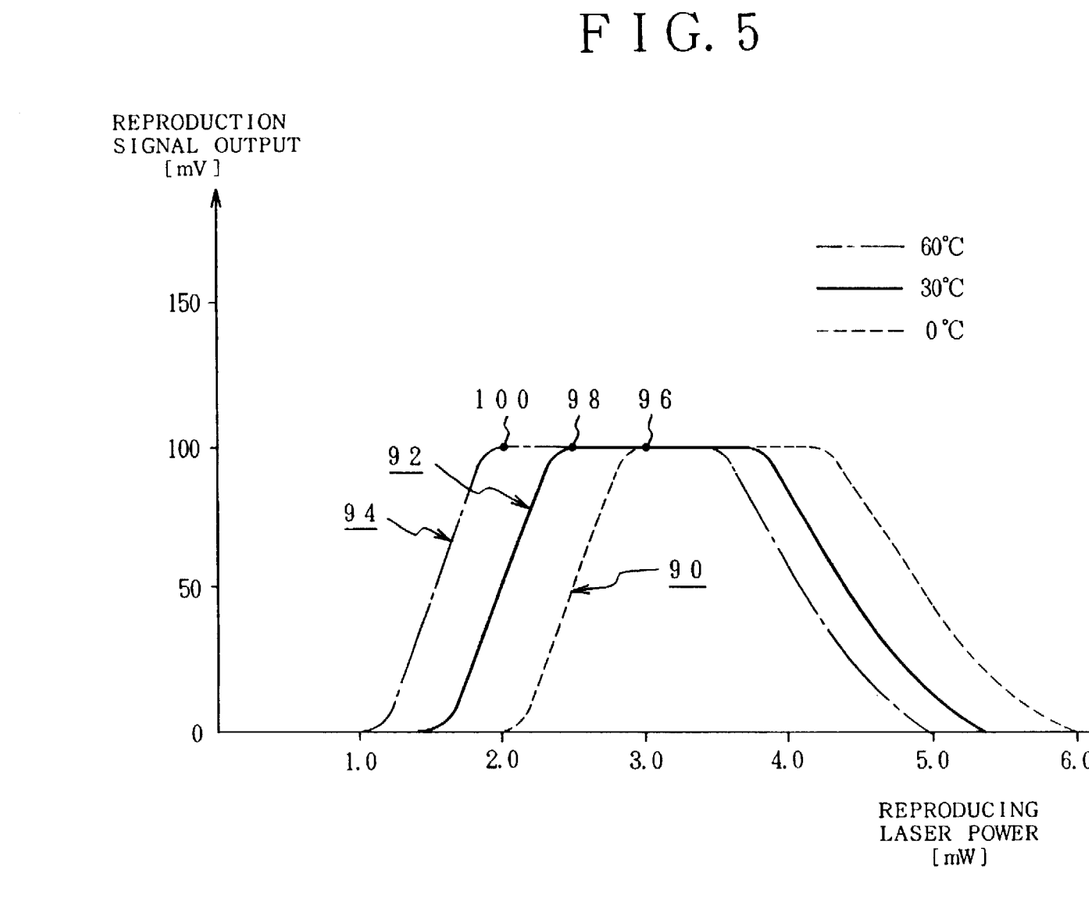
FIG. 5 is a characteristics diagram of a reproducing laser power and a reproduction signal output in the case where a temperature of a recording medium is used as a parameter.

FIG. 5 shows a reproduction signal output for a reproducing laser power of an optical disk which has at least a writing layer and a readout layer on a substrate and which is used in the invention and which uses the magnetically induced super resolution (MSR) technique for recording and reproducing at a recording density smaller than a beam diameter of a laser beam, in which a temperature is used as a parameter. A characteristics curve 90 shows a case where the environment temperature is equal to 0° C. A characteristics curve 92 indicates a case where the environment temperature is equal to 30° C. Further, a characteristics curve 94 shows a case where the environment temperature is equal to 60° C. For instance, when paying an attention to the characteristics curve 92 of the environment temperature 30° C., the reproduction signal output is derived when the reproducing laser power is equal to 1.5 mW. As the reproducing laser power increases, the reproduction signal output almost linearly increases in association with such a power increase. When the reproducing laser power reaches a point 98 of 2.5 mW, even if the reproducing laser power is increased to a power larger than 2.5 mW, the reproduction signal output is suppressed to, for example, 100 mV and becomes constant. For an increase in reproducing laser power, a range of the characteristics curve 92 in which the reproduction signal output increase corresponds to a state in which since the reproducing laser power is too weak, the recording information is not sufficiently transferred from the writing layer 120 to the readout layer 116 in the recording medium in FIG. 2A and the reproduction output signal lacks. Such a state is eliminated when the reproducing laser power reaches a power exceeding the point 98, so that the transfer from the writing layer to the readout layer is efficiently performed. On the other hand, when the reproducing laser power is further increased, the reproduction signal output starts to decrease from a power near 4.0 mW. No reproduction signal output is derived at a power near 5.5 mW. Such a state is a phenomenon which occurs since the reproducing laser power is too strong, the magnetization information in the writing layer is broken. Therefore, as an optimum laser power upon reproduction in the characteristics curve 92, it is desirable to use the reproducing laser power in a range from 2.5 to 3.5 mW in which the characteristics curve 92 is held to the reproduction signal output 100 mV as a constant level. Such characteristics are also fundamentally obtained with regard to the characteristics curve 90 in case of the environment temperature 0° C. and the characteristics curve 94 in case of the environment temperature 60° C. That is, as the environment temperature is low, the characteristics curve is shifted to the side of a high reproducing laser power. Since the environment temperature is low, a high reproducing laser power is needed. On the contrary, as the environment temperature rises, the characteristics curve is shifted to the side of a low reproducing laser power. Since a medium temperature also rises due to the environment temperature, a small laser power has to be set.

Figure 6:
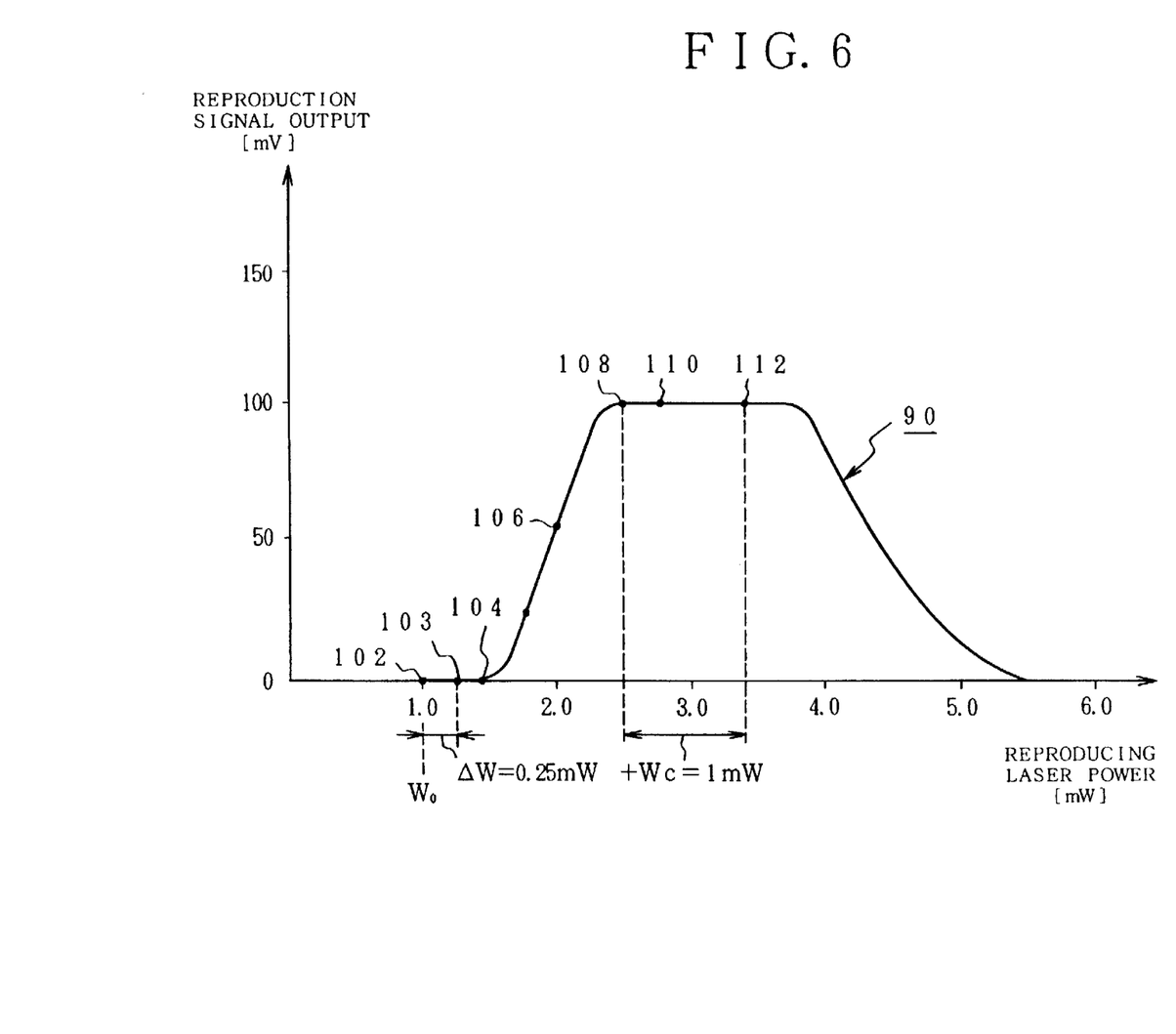
FIG. 6 is an explanatory diagram of a calibrating process of the invention in the characteristics diagram.

FIG. 6 shows a procedure for the calibrating process by the reproduction power calibrating module 74 of the invention in a state in which the environment temperature in the apparatus is equal to 30° C. and the characteristics curve 92 in FIG. 5 is obtained. According to the invention, a minimum reproducing laser power W0 is set as an initial value. As such a minimum reproducing laser power W0, for example, 1.0 mW serving as a reproduction signal output start point when the environment temperature is equal to 60° C. in FIG. 5 is used. When the minimum reproducing laser power is set to W0=1.0 and the reproducing operation is started, the reproducing laser power is subsequently increased step by step every predetermined micro power ΔW. As ΔW, a value of 0.5 mW, for example, ΔW=0.25 mW is used. The reproduction signal output when the reproducing laser power is increased by only ΔW=0.25 mW from the minimum reproducing laser power W0 is shifted to a point 103. When the power is further increased by 0.25 mW, the output is shifted to a point 104 and the reproduction signal output starts to be slightly generated. Further, when the power is increased by 0.25 mW two times and the reproducing laser power is set to 2.0 mW, the reproduction signal output shown at a point 106 is derived. Subsequently, when the power is increased by 0.25 mW two times, the output shown at a point 108 is derived. When the power is further increased by 0.25 mW, the reproducing laser power is shifted to a point 110. However, as compared with the preceding reproduction signal output at the point 108, the reproduction signal output at the point 110 doesn't increase. Therefore, it is judged that the reproduction signal output has already passed through an envelope portion of the characteristics curve, thereby obtaining the reproducing laser power W=2.5 mW at the preceding point 108. As mentioned above, when the reproducing laser power W at the point 108 in the envelope portion of the characteristics curve is obtained, a predetermined fixed value Wc is added to such a value and the resultant value is set as an optimum reproducing laser power. As a value Wc which is fixedly added, a predetermined value in a range from 0.5 mW to 2.5 mW is used. In the embodiment, Wc=1.0 mW is used.

Figure 7:
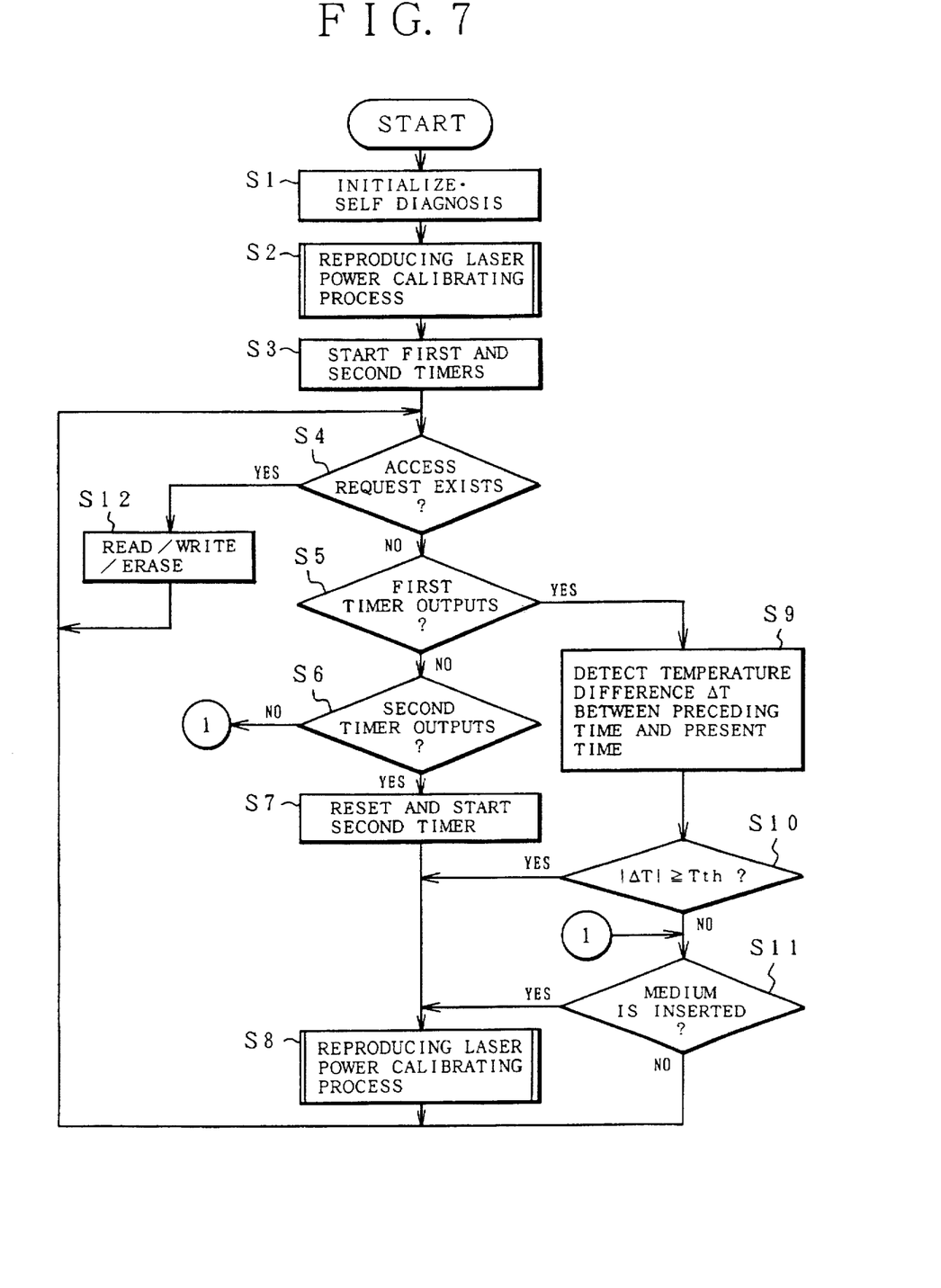
FIG. 7 is a flowchart for a whole process of the recording and reproducing operation of the invention.

A flowchart of FIG. 7 shows a whole process of the recording and reproducing operations in the optical disk apparatus of the invention. First in step S1, an initialization and a self diagnosis are performed in association with the power-on of the apparatus. The calibrating process of the reproducing laser power in step S2 is executed in the self diagnosing step. When the calibrating process of the reproducing laser power is finished, in step S3, the first and second timers 80 and 82 are started. In step S4, the apparatus waits for an access request from an upper optical disk control apparatus. When there is an access request, step S12 follows and the reading operation, writing operation, or erasing operation is performed. When there is no access request, step S5 follows and an output of the first timer in which, for example, the time of 12 hours has been set is checked. Until the elapse of 12 hours, an output of the second timer which generates the output every one hour is checked in step S6. In this instance, when the output of the second timer in which one hour has been set is obtained, the second timer 82 is reset and started in step S7. After that, the calibrating process of the reproducing laser power is performed in step S8. When the output of the second timer 82 is not obtained, step S11 follows and a check is made to see if the medium has been inserted or not. If YES, the calibrating process of the reproducing laser power is performed in step S8. Further, when the time of 12 hours elapses after the power-on start and the timer output of the first timer 80 is obtained, the processing routine advances from step S5 to step S9 and a temperature difference ΔT between the preceding and present environment temperatures which were measured at time intervals of every one hour set by the second timer is detected. In step S10, a check is made to see if the absolute value of the temperature difference ΔT is equal to or larger than a predetermined threshold temperature Tth or not. If YES, the calibrating process of the reproducing laser power is executed in step S8. If NO, a check is made to see whether the medium has been inserted or not in step S11. After that, the processing routine is returned to the process in step S4 again.

Figure 8:
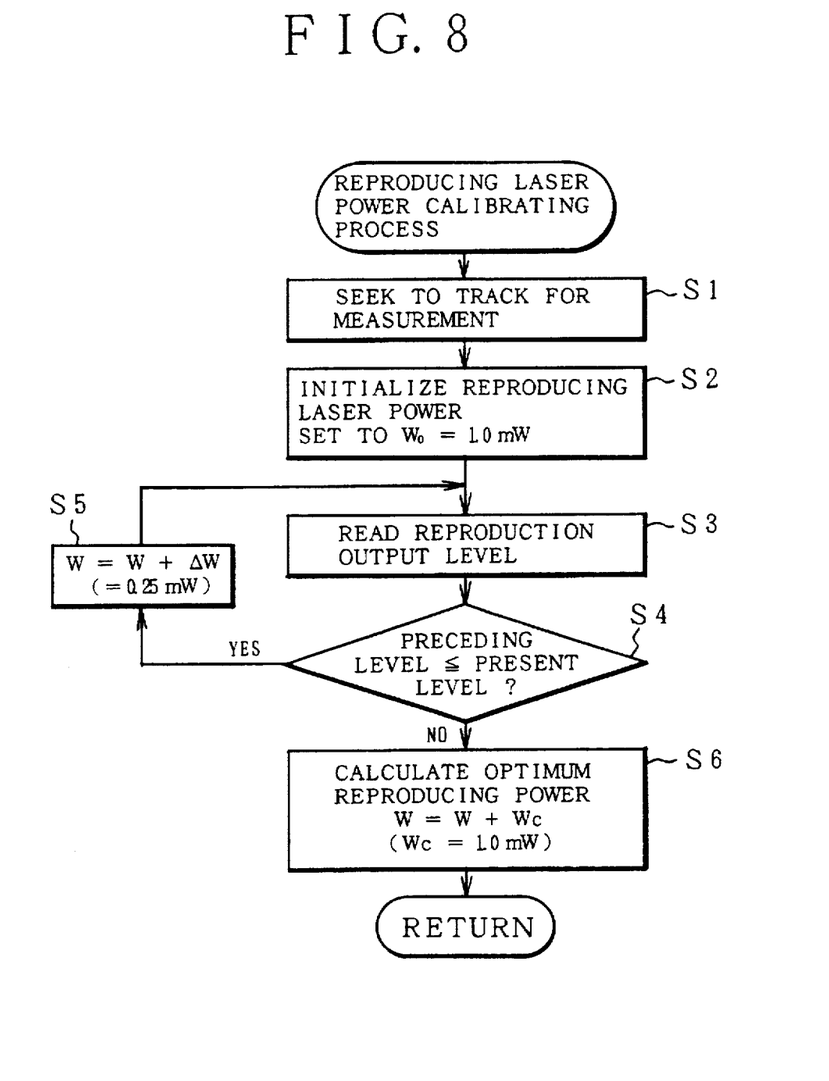
FIG. 8 is a flowchart for a reproducing laser power calibrating process in FIG. 7.

A flowchart of FIG. 8 shows the details of the reproducing laser power calibrating processes in steps S2 and S8 in FIG. 7. First in step S1, the optical head is sought to a track for measurement of a test zone which is secured as a system area and which is not used in the recording of data by the user, thereby setting the on-track control state. After the measurement data which is used for calibration was recorded, the track for measurement can be also reproduced every time, or the track on which the data has already been written can be also used as a track for measurement. In step S2, the reproducing laser power is set to the initial value W0=1.0 mW. In step S3, the reproduction output level is subsequently read. In step S4, the preceding reproduction output level is compared with the reproduction output level which is read at present. When the present level is higher, in step S5, the reproducing laser power W is increased by only ΔW, for example, 0.25 mW. The reproduction output level is again read in step S3. While the processes in steps S3 to S5 mentioned above are repeated, when the preceding reproduction output level is equal to or lower than the present reproduction output level in step S4, step S6 follows. The predetermined value Wc, for example, 1.0 mW is added to the value of the reproducing power W at that time, thereby calculating the optimum reproducing laser power.

Figure 9:
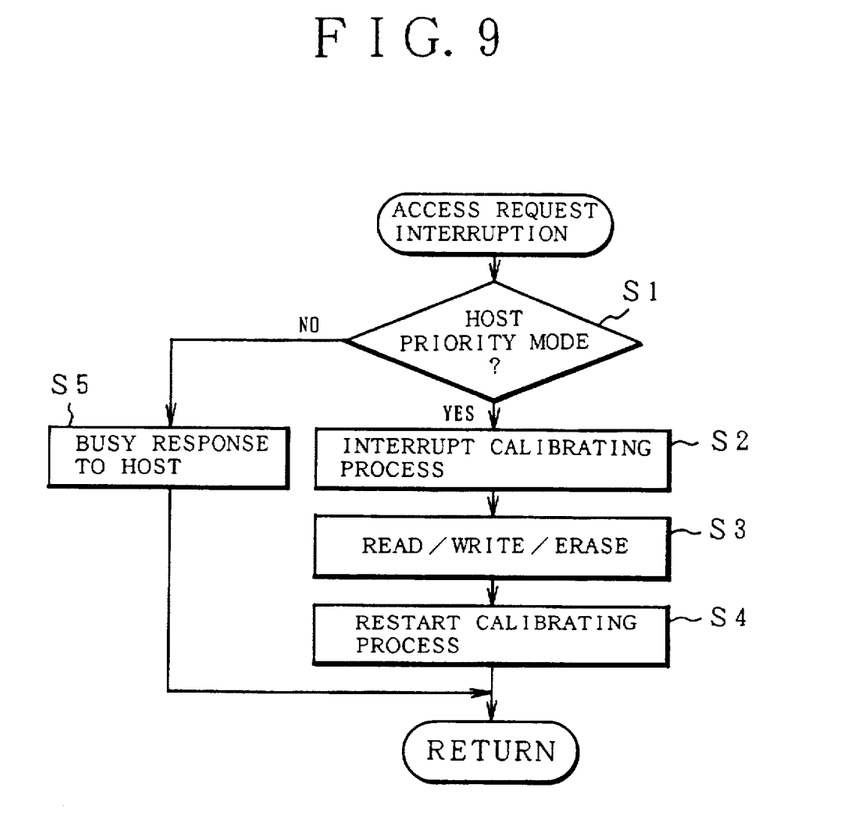
FIG. 9 is a flowchart for a process when there is an interruption request from a host side during the calibration in FIG. 8.

A flowchart of FIG. 9 relates to processes when an interruption by the access request from the upper optical disk control apparatus is performed during the execution of the reproduction laser power calibrating process in FIG. 8. When there is an interruption by the access request from the upper apparatus, first in step S1, a check is made to see if the mode is the host priority mode or not. When the host priority mode has been set in the priority mode setting element 86, the calibrating process is interrupted in step S2. The reading, writing, or erasing operation corresponding to the interruption request is executed in step S3. After completion of the access request interrupting process, the interrupted calibrating process is restarted in step S4. On the other hand, when it is judged in step S1 that the calibrating process priority mode has been set, a busy response is returned to the host side in step S5. The calibrating process is continued. After the busy response was cancelled in association with the end of the calibrating process, the access request from the host side is received. For example, until 12 hours by the first timer elapses from the power-on start of the apparatus, the environment temperature in the apparatus gradually increases and, in association with it, the medium temperature of the optical disk also fluctuates. Therefore, although the calibrating process of the reproducing laser power at, for example, every one hour by the second timer 82 is necessary, when a certain time elapses, the environment temperature in the apparatus is saturated and becomes stable. In this state, the medium temperature hardly fluctuates. Therefore, the calibrating process at every one hour, for example, by the second timer is stopped and the unnecessary calibration of the reproducing laser power is not executed. Even when an optical disk is newly inserted into the apparatus by an exchange of the cartridge of the apparatus, it is presumed that the environment temperature in the apparatus will fluctuate. Therefore, the calibrating process of the reproducing laser power is executed in response to the insertion of the medium. However, after that, so long as the temperature difference between the preceding and present temperatures which were measured at time intervals of every one hour by the second timer doesn't exceed a predetermined value, the calibration of the reproducing laser power is not executed. Thus, although there is a possibility of the occurrence of the interruption of the access request during the calibrating operation until the elapse of 12 hours at which the first timer 80 generates a timer output from the power-on start, the calibration of the reproducing laser power is not performed after that so long as the environment temperature in the apparatus doesn't largely change. Therefore, even if the calibration priority mode is set, a possibility such that the access request from the upper apparatus is waited by the calibrating operation is extremely low.

Figure 10:
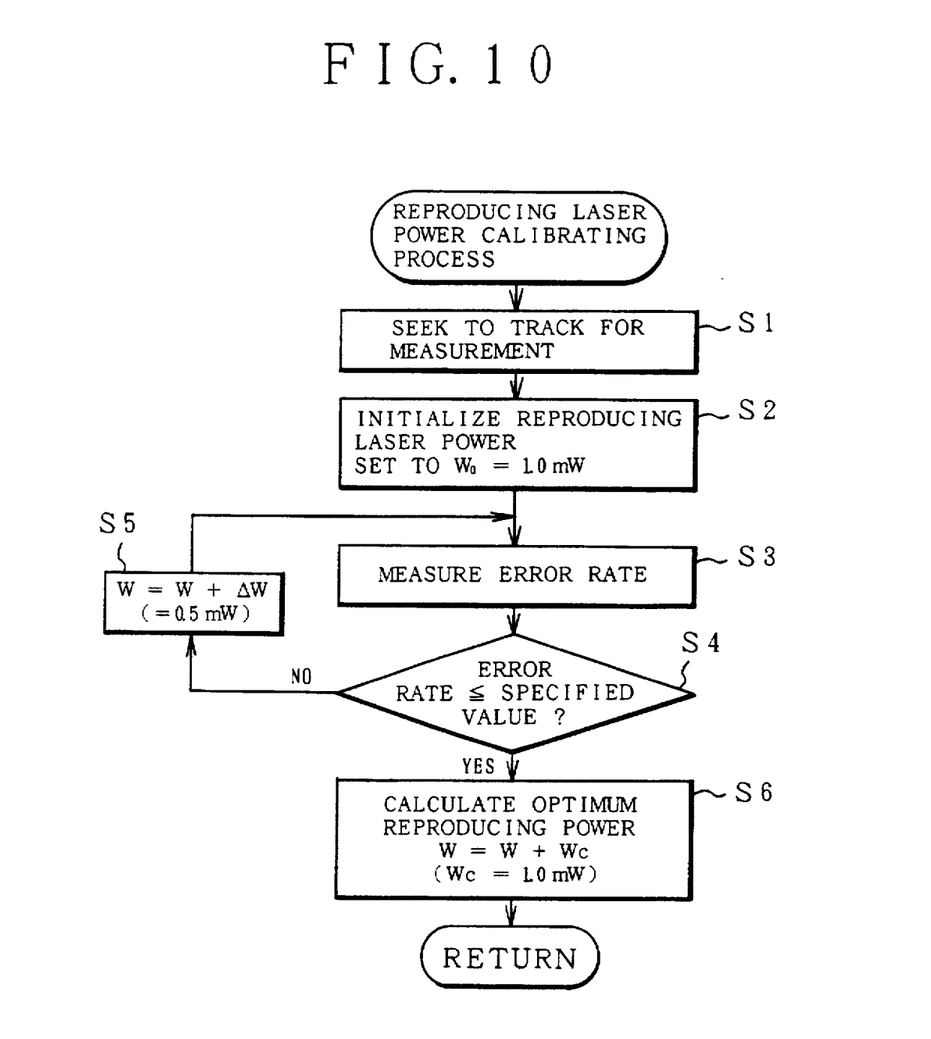
FIG. 10 is a flowchart of another embodiment of the reproducing laser power calibrating process in FIG. 8.

A flowchart of FIG. 10 shows another embodiment of the reproduction laser power calibrating process according to the invention. According to the embodiment, an error rate of the reproduction signal is measured in step S3 while increasing the reproducing laser power from the initial value W0 every ΔW=0.25 mW. Until the error rate is equal to or less than a specific value in step S4, the measurement while increasing the reproducing laser power every ΔW in step S5 is repeated. When the error rate is equal to or less than the specific value, the predetermined value Wc is added to the reproducing laser power at that time, thereby obtaining the optimum reproducing laser power in step S6. In step S4, when the error rate is equal to or less than the specific value, it is regarded that an envelope of the characteristics curve is detected. However, it is also possible to construct in a manner such that when there is no error, it is regarded that the envelope is detected, and the calculation of the optimum reproducing laser power in step S6 is executed. Further, the light emission of the laser diode by the optimum reproducing laser power decided by the calibrating process is used with respect to only the portion on the track to execute the magnetooptic recording and reproduction on the disk medium by using a reproduction gate signal which is generated upon reproduction. Thus, a continuous driving state during the reproduction of the laser diode by the optimum reproducing laser power is suppressed. The laser diode is protected and the life can be increased.

According to the invention as mentioned above, prior to reproducing, the optimum reproducing laser power adapted to the environment temperature in the apparatus is decided through the reproducing operation for calibration of the optical disk. Therefore, a situation such that the data recorded on the optical disk medium is broken by the reproducing laser beam or the data cannot be reproduced due to a lack of reproducing laser power can be certainly prevented. The reliability in case of recording or reproducing at a recording density smaller than the diameter of the beam spot can be remarkably improved. As for the calibrating process of the reproducing laser power, the envelope portion in which the characteristics curve is saturated is obtained while changing the reproducing laser power step by step from the initial value every predetermined power value. The predetermined value is added to it and the resultant power is set to the optimum reproducing laser power. Thus, the number of processing steps is reduced and the efficient calibrating process can be executed in a short time.

Although the above embodiment has been described with respect to the example of the exchangeable optical disk apparatus in which the optical disk medium is enclosed in the cartridge, the invention can be also applied as it is to an optical disk apparatus of a structure in which a plurality of optical disks are fixedly provided. The invention is not limited by the numerical values shown in the above embodiments.

What is claimed is:

1. An optical disk apparatus comprising:
   an optical recording medium having at least a writing layer to record data and a readout layer to reproduce the data recorded in said writing layer on a substrate;
   a recording unit for recording the data to said writing layer of said optical recording medium at a recording density smaller than a diameter of a focal spot of a laser beam;
   a reproducing unit for reproducing the data recorded in said writing layer of said optical recording medium at the recording density smaller than said focal spot diameter by setting a reproducing laser power to a proper value; and
   a reproduction power calibrating module for deciding an optimum value of the reproducing laser power which is used in said reproducing unit by executing a reproducing operation of said optical recording medium.

2. An apparatus according to claim 1, wherein said reproduction power calibrating module measures a change in reproduction signal while raising the reproducing laser power by using a predetermined minimum reproducing laser power as an initial value, and sets a reproducing laser power obtained by adding a predetermined value to the reproducing laser power when the reproduction signal does not change to an optimum reproducing laser power.

3. An apparatus according to claim 2, wherein said reproduction power calibrating module raises the reproducing laser power step by step at a resolution of at least 0.5 mW or less and decides the optimum reproducing laser power.

4. An apparatus according to claim 2, wherein said reproduction laser power calibrating module adds a predetermined value in a range from 0.5 to 2.5 mW to the value of the reproducing laser power when said reproduction signal does not change, thereby deciding the optimum reproducing laser power.

5. An apparatus according to claim 1, wherein said reproduction power calibrating module measures an error rate of the reproduction signal while raising the reproducing laser power by using a predetermined minimum reproducing laser power as an initial value, and sets the reproducing laser power obtained by adding a predetermined value to the reproducing laser power when no error occurs to the optimum reproducing laser power.

6. An apparatus according to claim 5, wherein said reproduction power calibrating module raises the reproducing laser power step by step at a resolution of at least 0.5 mW or less, thereby deciding the optimum reproducing laser power.

7. An apparatus according to claim 5, wherein said reproduction laser power calibrating module adds the predetermined value in a range from 0.5 to 2.5 mW to the value of the reproducing laser power when there is no error of said reproduction signal, thereby deciding the optimum reproducing laser power.

8. An apparatus according to claim 1, wherein the optimum reproducing laser power decided by said reproduction laser power calibrating module is used only for a reproducing period of time that is determined by a reproduction gate signal.

9. An apparatus according to claim 1, wherein said reproduction laser power calibrating module executes a calibration of the reproducing laser power at the time of an initialization diagnosing process in association with a turn-on of a power source of the apparatus.

10. An apparatus according to claim 1, wherein during the operation of the apparatus, said reproduction laser power calibrating module executes a calibration of the reproducing laser power at every predetermined time interval.

11. An apparatus according to claim 10, wherein said reproduction laser power calibrating module has a temperature sensor for detecting a using temperature of the apparatus, and upon calibration of the reproducing laser power, when a degree of change in temperature detected by said temperature sensor is smaller as compared with a preceding temperature, said reproduction laser power calibrating module stops the calibration of the reproducing laser power at every said predetermined time interval until the temperature change exceeds a predetermined value.

12. An apparatus according to claim 10, wherein when a degree of change of the value of the optimum reproducing laser power decided by the calibration of the reproducing laser power is smaller as compared with a preceding value, said reproduction laser power calibrating module stops the calibration of the reproducing laser power at said every predetermined time interval.

13. An apparatus according to claim 1, 11, or 12, wherein said reproduction laser power calibrating module executes the calibration of the reproducing laser power each time said optical recording medium is inserted into the apparatus.

14. An apparatus according to claim 10, wherein said reproduction laser power calibrating module can set a priority regarding whether the calibration is interrupted, and an interruption request from an optical disk apparatus controller is processed or the calibration is continued in response to said interruption request during the calibration of the reproducing laser power.

15. A recording and reproducing method of an optical recording medium of an optical disk apparatus, comprising the steps of:

providing an optical recording medium having at least a writing layer to record data and a readout layer to reproduce the data recorded in said writing layer on a substrate;

recording the data to the writing layer of said optical recording medium at a recording density smaller than a diameter of a focal spot of a laser beam;

reproducing the data recorded in the writing layer of said optical recording medium at the recording density smaller than the diameter of said focal spot by setting a reproducing laser power to a proper value; and executing a reproduction laser power calibrating process to decide an optimum value of the reproducing laser power upon reproduction by executing a reproducing operation of said optical recording medium prior to reproducing said optical recording medium.

16. A method according to claim 15, wherein in said reproduction laser power calibrating process, a change in reproduction signal is measured while raising the reproducing laser power by using a predetermined minimum reproducing laser power as an initial value, and a reproducing laser power obtained by adding a predetermined value to the reproducing laser power when the reproduction signal does not change is set to the optimum reproducing laser power.

17. A method according to claim 16, wherein in said reproduction laser power calibrating process, the reproducing laser power is raised step by step at a resolution of at least 0.5 mW or less, thereby deciding the optimum reproducing laser power.

18. A method according to claim 16, wherein in said reproduction laser power calibrating process, a predetermined value in a range from 0.5 to 2.5 mW is added to the value of the reproducing laser power when said reproduction signal does not change, thereby deciding the optimum reproducing laser power.

19. A method according to claim 15, wherein in said reproduction laser power calibrating process, an error rate of the reproduction signal is measured while raising the reproducing laser power by using a predetermined minimum reproducing laser power as an initial value, and a reproducing laser power obtained by adding a predetermined value to the reproducing laser power when no error occurs is set to the optimum reproducing laser power.

20. A method according to claim 19, wherein in said reproduction laser power calibrating process, the reproducing laser power is raised step by step at a resolution of at least 0.5 mW or less, thereby deciding the optimum reproducing laser power.

21. A method according to claim 20, wherein in said reproduction laser power calibrating process the predetermined value in a range from 0.5 to 2.5 mW is addded to the value of the reproducing laser power when there is no error in said reproduction signal, thereby deciding the optimum reproducing laser power.

22. A method according to claim 15, wherein the optimum reproducing laser power decided in said reproduction laser power calibrating process is used only for a reproducing period of time that is determined by a reproduction gate signal.

23. A method according to claim 15, wherein the calibration of the reproducing laser power is executed at the time of an initialization diagnosing process in association with a turn-on of a power source of the optical disk apparatus.

24. A method according to claim 15, wherein during the operation of the optical disk apparatus, the calibration of the reproducing laser power is executed at every predetermined time interval.

25. A method according to claim 24, wherein upon calibration of the reproducing laser power, when a degree of change in using temperature of the optical disk apparatus is smaller as compared with a preceding using temperature, the calibration of the reproducing laser power at said every predetermined time interval is stopped until the temperature change exceeds a predetermined value.

26. A method according to claim 24, wherein when a degree of change of the value of the optimum reproducing laser power decided by the calibration of the reproducing laser power is smaller as compared with a preceding value, the calibration of the reproducing laser power at said every predetermined time interval is stopped.

27. A method according to claim 15, 25, or 26, wherein the calibration of the reproducing laser power is executed each time said optical recording medium is inserted into the optical disk apparatus.

28. A method according to claim 15, wherein a priority regarding whether the calibration is interrupted and an interruption request from an optical disk apparatus controller is processed or the calibration is continued in response to said interruption request during the calibration of the reproducing laser power can be set.

* * * * *